(No Model.)
W. E. WELCH.
DUMPING WAGON.
No. 446,308. Patented Feb. 10, 1891.
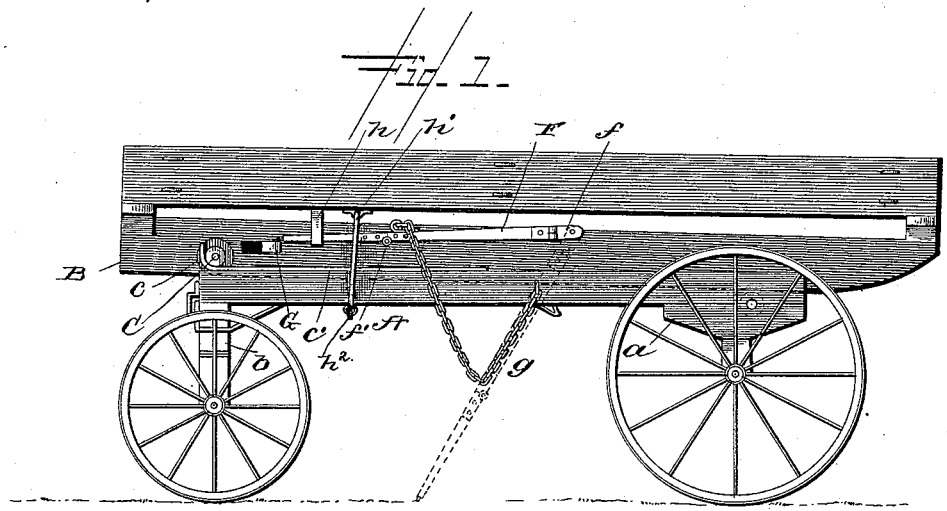
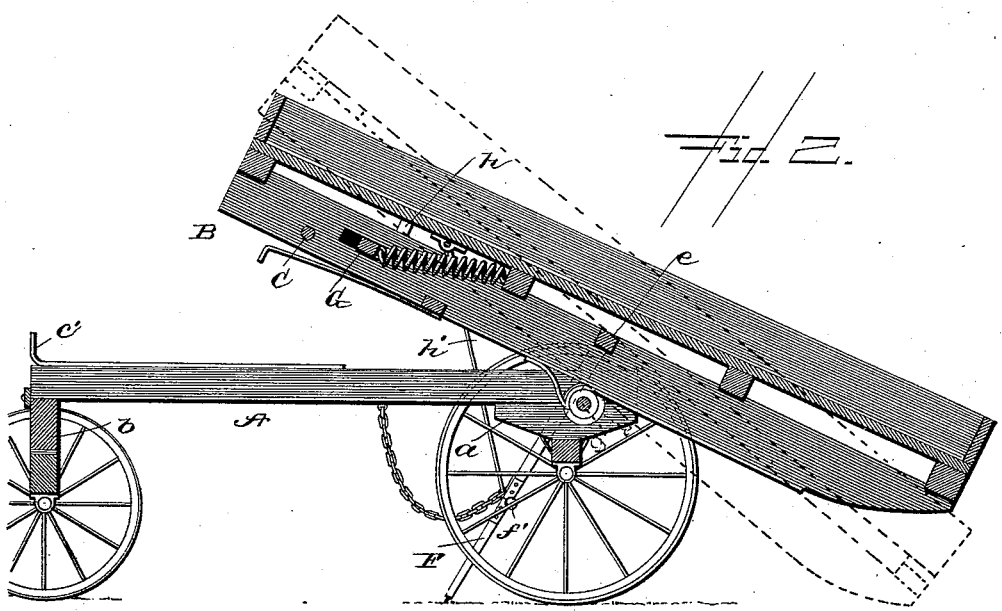
WITNESSES:
William E. Welch,
INVENTOR
BY
ATTORNEY.

UNITED STATES PATENT OFFICE.

WILLIAM E. WELCH, OF BUSHTON, ILLINOIS.

DUMPING-WAGON.

SPECIFICATION forming part of Letters Patent No. 446,308, dated February 10, 1891.

Application filed November 20, 1890. Serial No. 372,025. (No model.)

*To all whom it may concern:*

Be it known that I, WILLIAM E. WELCH, a citizen of the United States of America, residing at Bushton, in the county of Coles and State of Illinois, have invented certain new and useful Improvements in Dumping-Wagons; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in dumping-wagons, and has for its object to facilitate dumping the contents of a wagon loaded with any kind of material, and is more especially designed as an improvement upon my patent dated August 13, 1889.

In the accompanying drawings, Figure 1 is a side view of a wagon constructed in accordance with my invention. Fig. 2 is a side view partly in section.

The running-gear of the wagon is of ordinary construction, and above the bolsters of the front and rear axles are secured supplemental bolsters $a$ and $b$, which serve as supports for side beams A, which are provided on their upper edges with metallic strips $c$, the ends of which are upturned, as shown. The front supplemental bolster $b$ carries a pivoted lever, which engages with a catch carried by the wagon-body, as shown in my prior patent.

Secured to the side beams A A, directly above the bolster $a$, is a shaft D, upon which are mounted flanged rollers $c$ $c$, upon which bear the sill-pieces B B of the wagon-body, the lower edges of these sill-pieces near their rear ends being provided with wear-plates, the forward ends of which are formed into hooks for engaging with the flanged rollers when the body is brought to an inclined position. To near the forward ends of the sill-pieces B B is journaled a shaft $c$ $p$, the ends of which project beyond the sill-pieces and are provided with flanged rollers, which rest upon the wear-plates $c'$, the forward ends of which are curved upwardly.

To the sill-pieces B B, about centrally, is secured a transverse bar $e$, to the ends of which are pivotally secured blocks $f$, to which are hinged the upper sections of the arms F, provided centrally with knuckle-joints, as shown. To these arms adjacent to the knuckle-joints are secured chains or flexible connections $g$, the opposite ends of which are securely attached to the longitudinal beams A. The arms F when elevated or not in use rest upon the projecting ends of a sliding bar G, mounted in slots in the sill-pieces B B, said sliding bar being held normally in the rear end of the slot by springs, and the length of the slots in the sill-pieces is such that by moving said bar forwardly the pivoted arms F will be released, and outward movement of the pivoted arms is prevented by angle-plates $h$, carried by the bottom board of the wagon. One of the pivoted arms F is provided with a flexible connection $h'$, which is attached thereto and passes through guides to the opposite side of the wagon-body, where it is provided with a ring, and when it is desired to elevate one of these bars F without going around the wagon it can be done by simply drawing upon the flexible connection, and when the ring is caused to engage the hook $h^2$ the jointed arm F will be held in a raised position.

When it is desired to dump the contents of a wagon provided with my improvements, the flexible connection $h$ is released, and by pushing the sliding bar $g$ forward the levers or pivoted arms F will be allowed to fall and engage with the ground. Now by simply releasing the latch at the forward end of the wagon and drawing the running-gear forward the body will slide upon the beams A and be tilted when the rear end overbalances the front.

By providing the pivoted levers F with the upper hinge-joint they will be permitted to swing outwardly to adapt them to the inequalities of the ground, while by providing the knuckle-joints $f'$ they can be readily released from the ground when it is desired to elevate the same.

Having thus described my invention, what I claim as new, and desire to secure by Letters Patent, is—

1. The combination, with the running-gear of a wagon constructed substantially as shown, of a body adapted to slide thereon and be inclined so as to dump its load and levers F, pivotally secured to the movable body and provided with knuckle-joints, substantially as set forth.

2. The combination, in a dumping-wagon having a body adapted to slide upon the running-gear and tilt thereon, of pivoted levers secured to the body and provided with hinge-joints for permitting the outward swing of said levers and knuckle-joints below the hinge-joints, substantially as shown, and for the purpose set forth.

3. In combination with the running-gear of a vehicle, a body adapted to slide thereon, levers F, pivotally connected to said body and provided with hinge-joints to permit them to swing outwardly, knuckle-joints near their lower ends, and flexible connections secured to said levers and to the running-gear of the vehicle, substantially as set forth.

4. The combination, with the running-gear of a vehicle having a body adapted to slide and tilt thereon, of pivoted bars carried by the body, and chains connected to said bars and to the running-gear, said bars having knuckle-joints, substantially as shown.

5. The combination, in a dumping-wagon constructed substantially as shown, of levers F, pivotally secured to the body and provided with knuckle-joints, whereby the body will be moved upon the running-gear when the lower ends of said levers contact with the ground, and chains connecting the levers at or above the knuckle-joints with the running-gear of the vehicle, so that they will bend upon the forward movement of the running-gear when the body is in an inclined position, substantially as shown, and for the purpose set forth.

6. The combination, in a dumping-wagon carrying pivoted levers F, of a flexible connection $h$, attached to one of said levers and passed through guides to the opposite side of the wagon, whereby the pivoted lever to which the flexible connection is attached can be elevated from the opposite side of the wagon, substantially as set forth.

7. The combination, in a dumping-wagon constructed substantially as shown, of the levers F, sliding bar for holding the same in position, and angle-irons for preventing their outward movement when elevated, substantially as and for the purpose set forth.

In testimony whereof I affix my signature in presence of two witnesses.

WILLIAM E. WELCH.

Witnesses:
WM. A. MILLS,
CHAS. S. WILEY.